United States Patent
Patil et al.

(10) Patent No.: US 8,041,906 B2
(45) Date of Patent: Oct. 18, 2011

(54) NOTIFICATION PROCESSING

(75) Inventors: Deepak S. Patil, Roseville, CA (US); Lisa Pinio, Foresthill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 751 days.

(21) Appl. No.: 11/590,498

(22) Filed: Oct. 31, 2006

(65) Prior Publication Data

US 2008/0104342 A1 May 1, 2008

(51) Int. Cl.
*G06F 12/02* (2006.01)

(52) U.S. Cl. .......... 711/156; 710/19; 711/104; 711/144; 711/173

(58) Field of Classification Search ................... 711/156, 711/104, 144, 173; 710/19
See application file for complete search history.

(56) References Cited

U.S. PATENT DOCUMENTS

| | | | |
|---|---|---|---|
| 2002/0091965 A1* | 7/2002 | Moshayedi | 714/8 |
| 2002/0124137 A1* | 9/2002 | Ulrich et al. | 711/113 |
| 2003/0065886 A1* | 4/2003 | Olarig et al. | 711/129 |
| 2003/0196031 A1* | 10/2003 | Chen | 711/104 |
| 2006/0090045 A1* | 4/2006 | Bartlett et al. | 711/156 |

* cited by examiner

*Primary Examiner* — Jae Yu

(57) ABSTRACT

Embodiments for notification processing are disclosed. One embodiment includes dividing the number of data entries of an array, having a number of data entries that each utilize a variable having a changeable state, into a number of blocks. The number of blocks include a flag indicating whether at least one of the number of entries in the block has been modified. The method includes identifying at least one of the number blocks that has at least one modified entry by checking the flag and processing the at least one identified block to determine a current state of at least one the variables having a changeable state whose corresponding data entry has been modified.

22 Claims, 4 Drawing Sheets

NOTIFICATION PROCESSING

INTRODUCTION

Internal to many computing devices (e.g., networking devices and/or components such as switches, routers, etc.) there are often one or more queues responsible for holding items, such as packets of information, and other types of information that are used in the network computing device's global operation. A queue is used during the routing of information to hold information until a forwarding resource is available. For example, queues are used to hold information, such as computer executable instructions and/or data, waiting to be processed by a processor.

As an example, a queue can be used to hold information associated with variables such as global variables that may be shared by multiple software modules and/or processes thereof. In various cases, two processes may share a number (e.g., tens, hundreds, or thousands) of variables that can have changeable states. In such cases, it can be beneficial to notify a process when one of the shared variables changes states so the process maintains an updated state of the variable. Often times, the variables can change states frequently.

For example, various computing devices such as routers, switches, hubs, servers, desktop PCs, laptops, and workstations, or peripheral devices (e.g., printing devices, facsimile devices, and scanning devices) can be networked together across a local area network (LAN) and/or wide area network (WAN). Such devices can have numerous ports to which other devices can be physically connected and/or disconnected. In addition to physical connections, networks can also form virtual connections (e.g., logical). For instance, a virtual LAN (VLAN) is a logical subgroup within a LAN that is created via executable instructions (e.g., software) rather than manually moving cables in the wiring closet. It combines user stations and network devices into a single unit regardless of the physical LAN segment to which they are attached and can allow traffic to flow more efficiently within populations of mutual interest.

Queue overflow can occur when many variables are changing state and the state change information is added to the queue. In such cases, some state change information in the queue can be lost which can result in a process receiving incorrect state information which can lead to slow and/or erroneous processing. Furthermore, processing state change information associated with numerous variables can affect other processes being executed by a computing system. For instance, a system can expend a significant amount of processor resources processing queued state change information, leaving less processor resource availability for executing other processes.

DETAILED DESCRIPTION

Figure 1:
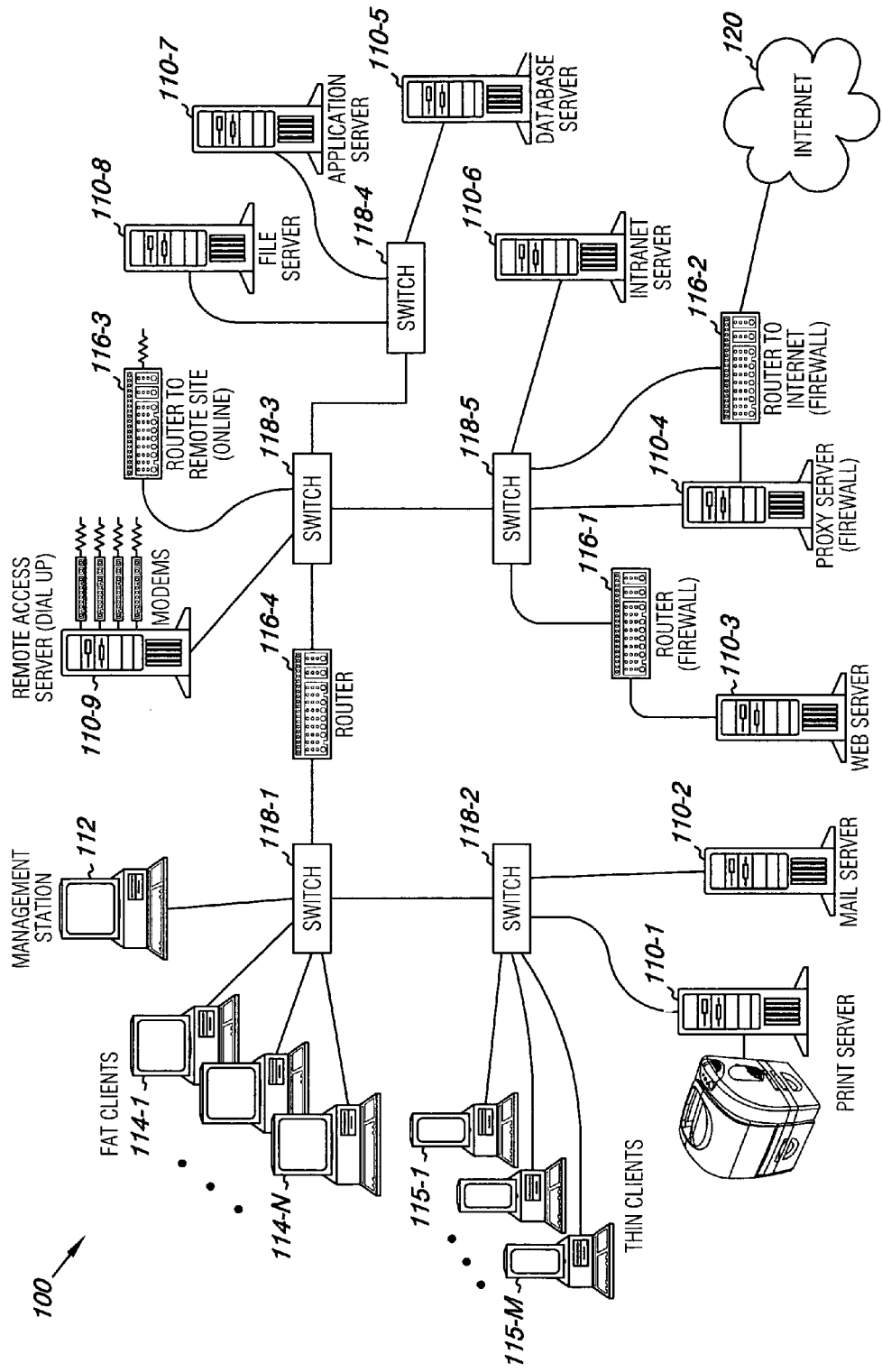
FIG. 1 is an embodiment of a computing device network of the present disclosure.

Embodiments of the present disclosure provide methods and systems for processing state change notifications associated with variables shared by system processes. An embodiment for processing notifications can include creating an array having a number of data entries (e.g., array elements) that utilize a variable having a changeable state. The number of data entries and/or variables can be 10, 100, 1,000, or 10,000, among various other values. A variable can include various types of information and/or data that can be shared by processes. In various embodiments, a variable can change state. For example, a variable can be a port that can have an active/inactive state, a switch that can have an on/off state, or a cable that can have a connected/disconnected state. Embodiments are not so limited. For example, embodiments may include variables that have more than two possible states or the variable may be a value added to a data storage position that did not previously have a value therein.

In various embodiments, the data entries of the array can be divided into a number of blocks. In such embodiments, the array entries can be partitioned in various manners. For example, the number of blocks can each include the same number of array entries. For instance, if the total number of array entries were 1,000, then each of ten blocks could include 100 entries.

In various embodiments, the blocks can include a flag, such as a dirty bit, for example, which can be used to indicate whether a block has entries which have been modified (e.g., whether one or more entries in the block corresponds to a variable that has changed state). For instance, in embodiments in which the flag is a dirty bit, the dirty bit of the block can be set (e.g., to a logic "1") to indicate that the block includes modified entries (e.g., entries having a state change notification that a state of a variable has been updated).

In various embodiments, instructions can be executed by a processor to modify the number of entries that correspond to a variable having a changeable state when the state of the variable changes. That is, instructions can be executed to update the entries in the number of array blocks when corresponding state changes occur (e.g., when a switch is turned on/off, etc).

In various embodiments, instructions can be executed to overwrite the block entries when a corresponding variable state change occurs such that an entry contains information about a most recent state change (e.g., the entry indicates a current state of the corresponding variable and not a prior state or states). Embodiments, in which only the most recent state change information is stored, can provide benefits such as reduced processing time and/or reduced memory resource usage, among others.

In various embodiments of the present disclosure, instructions can be executed to identify blocks that have modified entries (e.g., state change notifications) by checking the flag. In such embodiments, one or more of the identified blocks (e.g., blocks having the flag set) are processed to determine a current state of at least one of the variables whose corresponding data entry has been modified.

In various embodiments, blocks whose flag is not set (e.g., blocks that do not contain at least one state change notification) are not processed. In such embodiments, not processing unflagged blocks can conserve processor resources, which can be used to execute various other tasks and processes.

In various embodiments, processing of the blocks is performed by a background process. In such embodiments, the background process can wake up periodically to check the flags of the blocks. That is, the process can cycle through the flags to determine which, if any, of the blocks include state change notifications.

The timing of when the background process runs, the rate at which the process checks the flags, and/or the number of block entries processed by the process can be configurable. For example, instructions can be executed to cause a background process to check flags at a rate of one flag per clock cycle, two flags per clock cycle, or one flag per 50 clock cycles, among other rates. In various embodiments, controlling the rate at which the block processing occurs can reduce and/or prevent processor resources from becoming overloaded and can conserve the processor resources which can reduce and/or prevent the likelihood of other processes from being starved.

FIG. 1 is an embodiment of a computing device network 100 in which embodiments of the present disclosure can be implemented. As shown in FIG. 1, a number of devices (e.g., PCs, servers, peripherals, etc.), can be networked together via a LAN and/or WAN via routers, hubs, switches, and the like (referred to herein as "network devices"). FIG. 1 illustrates clients and servers in a LAN. For example, the embodiment of FIG. 1 shows various servers for various types of service on a LAN. However, embodiments of the present disclosure are not so limited.

The example network of FIG. 1 illustrates a print server 110-1, a mail server 110-2, a web server 110-3, a proxy server (e.g., firewall) 110-4, a database server 110-5, intranet server 110-6, an application server 110-7, a file server 110-8, and a remote access server (e.g., dial up) 110-9. Again, the examples provided here do not provide an exhaustive list of devices that can be part of a network.

The embodiment of FIG. 1 further illustrates a network management server 112 (e.g., a PC or workstation), a number of "fat" clients 114-1, ..., 114-N which can also include PCs and workstations and/or laptops, and a number of "thin" clients 115-1, ..., 115-M which can include terminals and/or peripherals such as scanners, facsimile devices, handheld multifunction device, and the like. The designators "N" and "M" are used to indicate that a number of fat or thin clients can be attached to the network 100. The number that N represents can be the same or different from the number represented by M.

As shown in FIG. 1, all of these example network devices can be connected to one another and/or to other networks via routers, 116-1, 116-2, 116-3, and 116-4, and hubs and/or switches 118-1, 118-2, 118-3, 118-4, and 118-5. Embodiments of the disclosure, however, are not limited to the number and/or type of network devices in FIG. 1's illustration.

As one of ordinary skill in the art will appreciate, many of these devices include processor and memory hardware. By way of example and not by way of limitation, the network management server 112 can include a processor and memory. Similarly, the network devices of routers, 116-1, 116-2, 116-3, and 116-4, and hubs and/or switches 118-1, 118-2, 118-3, 118-4, and 118-5 may include processor and memory resources. Embodiments of the disclosure are not limited to the number, type, or size of processor and memory resources of the various devices in the network.

Instructions (e.g., computer executable instructions), as described in more detail below, can reside on the various network devices. For example, computer executable instructions in the form of firmware, software, etc., can be resident on the network 100 in the memory of a network management server 112 and/or one or more routers, 116-1, 116-2, 116-3, and 116-4, and hubs and/or switches 118-1, 118-2, 118-3, 118-4, and 118-5, and can be executable by the processor(s) thereon. As the reader will appreciate, instructions can be resident in a number of locations on various network devices in the network 100 as employed in a distributed computing network.

As one of ordinary skill in the art will appreciate, each network device in a network is associated with a port of a switch to which it is connected. Data frames, or packets, can be transferred between network devices by means of a switch's logic link control (LLC)/media access control (MAC) circuitry, or "engines", associated with each switch port.

The network switch passes data frames received from a transmitting network device to a destination network device based, for example, on the header information in the received data frame. The switch can also link a given network to other networks through one or more pre-designated switch ports.

Figure 2:
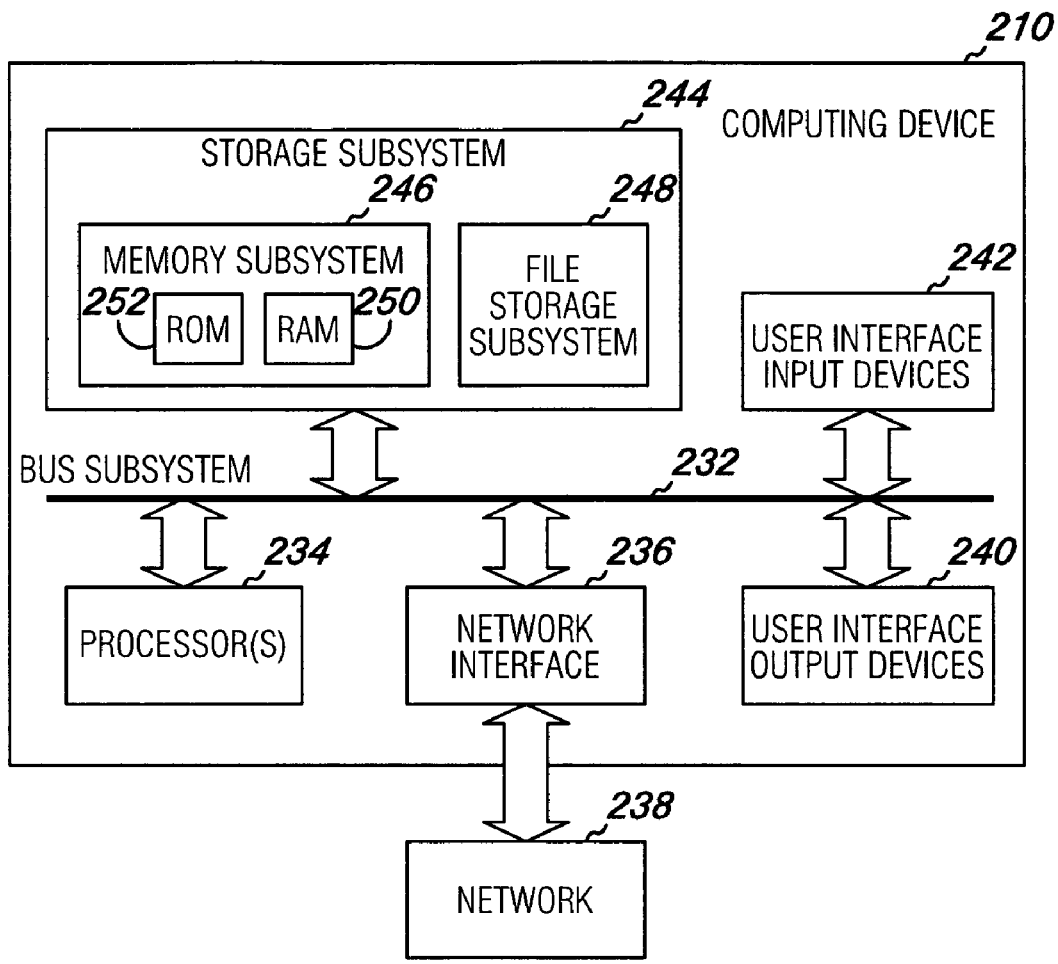
FIG. 2 is a block diagram of a computing device that can be utilized with the embodiments of the present disclosure.

FIG. 2 is a block diagram of a computing device that can be utilized with the embodiments of the present disclosure. In the embodiment of FIG. 2, computing device 210 includes one or more processors 234 that communicate with a number of other computing components via bus subsystem 232.

These other computing components may, for example, include a storage subsystem 244 having a memory subsystem 246 and a file storage subsystem 248, user interface input devices 242, user interface output devices 240, and a network interface subsystem 236, to name a few. The input and output devices allow user interaction with computing device 210.

Network interface subsystem 236 provides an interface to outside networks, including an interface to network 238 (e.g., a LAN, WAN, Internet, and/or wireless network, among others), and is coupled via network 238 to corresponding interface devices in other computer systems or devices. Network 238 may itself include many interconnected computer systems and communication links. Communication links as used herein may be hardwire links, optical links, satellite, or other wireless communications links, wave propagation links, or any other mechanisms for communication of information.

User interface input devices 242 may include a keyboard; pointing devices such as a mouse, trackball, touchpad, or graphics tablet, a scanner, a touchscreen incorporated into a display; audio input devices such as voice recognition systems, microphones, and other types of input devices. In general, use of the term "input device" is intended to include all possible types of devices and ways to input information into computer system 210 or onto computer network 238.

User interface output devices 240 may include a display subsystem, a printing device, a facsimile device, or non-visual displays such as audio output devices. In general, use of the term "output device" is intended to include all possible types of devices and ways to output information from computer system 210 to a user or to another machine or computer system 210.

Storage subsystem 244 can include the operating system "kernel" layer and an application layer to enable the device to perform various functions, tasks, or roles. File storage subsystem 248 can provide persistent (e.g., non-volatile) storage for additional program and data files, and may include a hard disk drive, a floppy disk drive along with associated removable media, a Compact Digital Read Only Memory (CD-ROM) drive, an optical drive, or removable media cartridges, among others. Memory subsystem 246 typically includes a number of memory components including a main Random Access Memory (RAM) 250 for storage of executable instructions and data (e.g., application programs) during program execution, and a Read Only Memory (ROM) 252 in which fixed instructions (e.g., operating system and associated kernel) are stored.

In various embodiments of the present disclosure, memory subsystem 246 can be used to store instructions that can be executed by processor 234 to create an array that includes a number of entries that correspond to information that can change state. Such information can include status information, e.g., variables, such as whether various input devices 242 and/or output devices 240 are connected, or whether a network connection is established, among various other status information.

As described further below in connection with FIG. 3, executable instructions storable in memory subsystem 246 can be executed by processor 234 to partition the number of entries of the array into a number of blocks. In various embodiments, the number of blocks have an associated flag that indicates whether at least one of the number of entries in the block has been modified.

The instructions can be executed to modify the number of entries that correspond to information that can change state when the state of the information changes such that the modified entries include a state change notification that indicates a current state of the information. The instructions can also be executed to identify at least one of the number of blocks that has a modified entry by checking the associated flag and process at least one state change notification of the at least one identified block.

As used herein, a computer readable medium is intended to include the types of memory described above, among others. Method embodiments, as will be described further herein, can be included with a computer readable medium and may also be provided using a carrier wave over a communications network such as the Internet, among others. Bus subsystem 232 provides a mechanism for letting the various components and subsystems of computer system 210 communicate with each other as intended.

Program embodiments according to the present disclosure can be stored in the memory subsystem 246, the file storage subsystem 248, and/or elsewhere in a distributed computing environment. Due to the ever-changing nature of computing devices and networks, the description of computing device 210 depicted in FIG. 2 is intended only as one example of a computing environment suitable for implementing embodiments of the present disclosure. Many other configurations of computer system 210 are possible having more or less components than the computing device depicted in FIG. 2.

Figure 3:
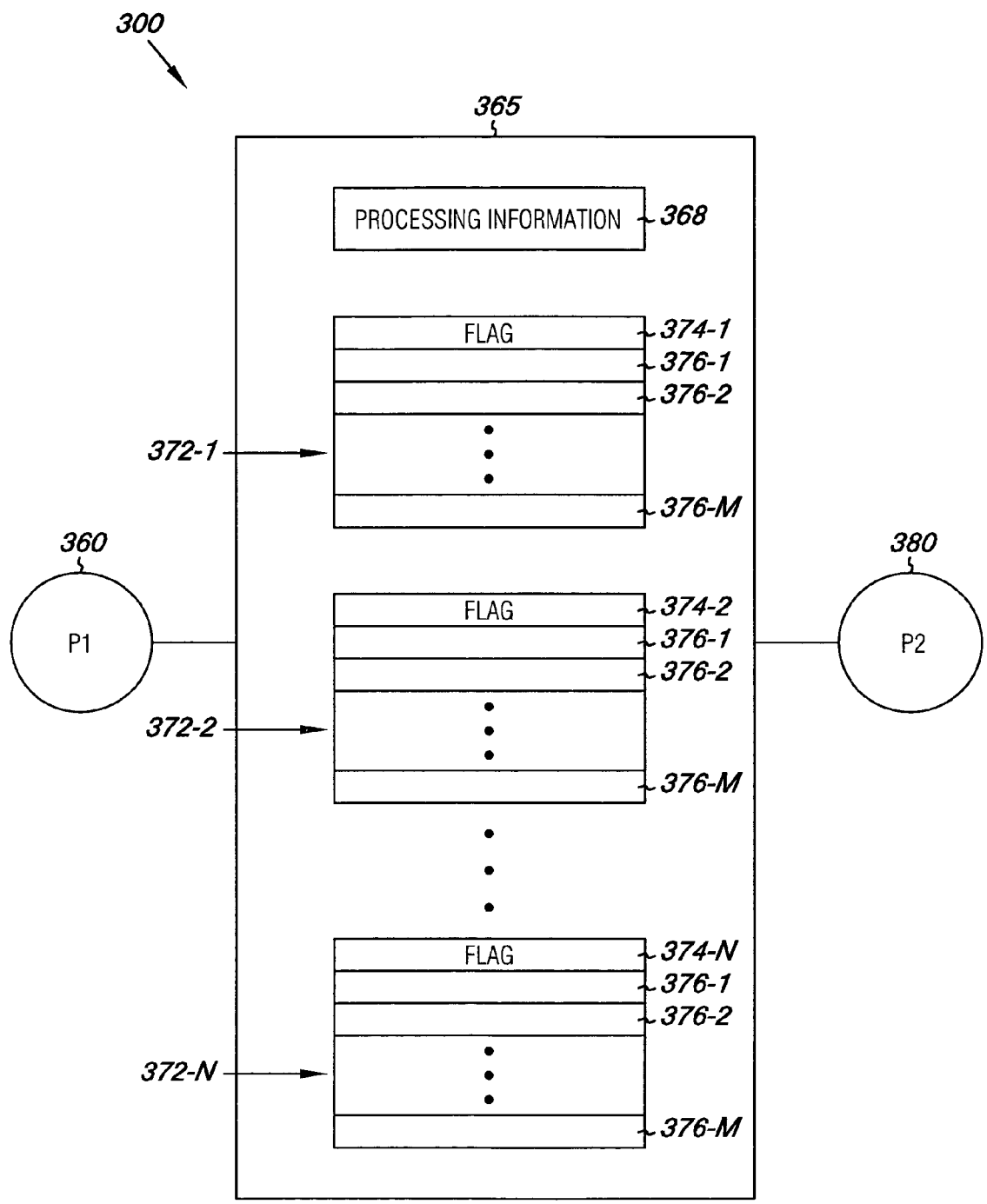
FIG. 3 is a block diagram illustrating a system for notification processing according to an embodiment of the present disclosure.

FIG. 3 is a block diagram illustrating a system 300 for notification processing according to an embodiment of the present disclosure. The system 300, illustrated in FIG. 3, includes a first process 360 (shown as P1) and a second process 380 (shown as P2).

In this embodiment, process 360 represents a process that includes a number of variables, e.g., data that have a changeable state. As mentioned above, the variables can include global variables that can be shared by multiple software modules and/or processes associated therewith (e.g., processes 360 and 380 in the embodiment of FIG. 3).

In the embodiment illustrated in FIG. 3, the first process 360 represents a sending process (e.g., a process that sends state change notifications to another process). As an example, process 360 can be a process of a software module that includes a set of executable instructions that are executed to monitor a number of variables having a changeable state.

For instance, process 360 can be used to monitor a number of internet switches, ports, or various other functions having a changeable state. As noted above, such changeable state variables can change state numerous times as various switches, ports, and/or cables are turned on/off, activated/inactivated, plugged in/out, etc. In such cases, it can be beneficial for modules and/or processes using such variables to be made aware of the current state of the variables as the module and/or process executes.

In the embodiment illustrated in FIG. 3, process 380 represents a receiving process (e.g., a process that receives state change notifications). As an example, process 380 can be a process of a software module that includes a set of executable instructions that are executed to process state change notifications.

Embodiments are not limited to the example processes 360 and 380 described in connection with FIG. 3. That is, process P1 and P2 can be various other processes having shared variables.

The embodiment illustrated in FIG. 3 includes an array 365 that can be used to process state change notifications associated with variables shared by system processes (e.g., processes 360 and 380). The array 365 can be a byte array or other data structure suitable for representing state change notifications. In various embodiments, executable instructions storable on a memory resource can be executed by a processor resource to divide or partition the entries (e.g., array elements) of array 365 into a number of blocks. In the embodiment illustrated in FIG. 3, the entries of array 365 are divided into a number of blocks 372-1, 372-2, . . . 372-N.

As shown in the embodiment of FIG. 3, the number of blocks include a number of array entries 376-1, 376-2, . . . , 376-M. Embodiments are not limited to blocks having the same number of array entries.

The array entries 376-1, 376-2, . . . , 376-M of the blocks 372-1, 372-2, . . . , 372-N can correspond to variables having a changeable state. For example, a variable can be a port that can have an active/inactive state, a switch that can have an on/off state, or a cable that can have a connected/disconnected state. Embodiments are not so limited. For example, embodiments may include variables that have more than two possible states or embodiments having no value and a value is subsequently added or vice versa.

In various embodiments, and as shown in FIG. 3, the blocks 372-1, 372-2, . . . , 372-N can include an associated flag (e.g., 374-1, 374-2, and 374-N). In various embodiments, the flags can be used to indicate whether a block has entries which have been modified (e.g., whether one or more entries in the block corresponds to a variable that has changed state). For instance, in some embodiments, the flag can be a dirty bit as is known in the art.

In such embodiments, the dirty bit of the block can be set (e.g., to a logic "1") to indicate that the block includes modified entries (e.g., entries having a state change notification that a state of a variable has been updated). In some embodiments, the flags 374-1, 374-2, . . . , 374-N can be included in a separate block (e.g., in a block separate from blocks 372-1, 372-2, . . . , 372-N).

In the embodiment illustrated in FIG. 3, the array 365 includes processing information 368 which can include various information, such as instructions, which can be executed to perform tasks including configuring the array elements into blocks, overwriting array entries, and setting and/or resetting the flags, among other tasks as described below. It is noted that processing information 368 can be contained in locations other than the array 365 (e.g., elsewhere in RAM).

In various embodiments, instructions can be executed by a processor to modify the number of entries 376-1, 376-2, . . . , 376-M that correspond to a variable having a changeable state when the state of the variable changes. That is, instructions can be executed to update the entries in the number of array blocks when corresponding state changes occur (e.g., when a switch is turned on/off, etc.). In various embodiments, process 360 (e.g., a sending process) can be used to modify the entries 376-1, 376-2, . . . , 376-M.

In various embodiments, instructions can be executed to overwrite the block entries when a corresponding variable state change occurs such that an entry only contains information about a most recent state change (e.g., the entry indicates a current state of the corresponding variable and not a prior state or states). In other words, a prior state change notification can be overwritten with a subsequent state change notification such that the prior state change notification is removed from the modified entry. Embodiments in which only the most recent state change information is stored can provide benefits such as reduced processing time and/or reduced memory resource usage, among others.

In various embodiments of the present disclosure, instructions can be executed to identify blocks that have modified entries (e.g., state change notifications) by checking the associated flag 374-1, 374-2, . . . , 374-N. In such embodiments, one or more of the identified blocks (e.g., blocks having the flag set) are processed to determine a current state of at least one of the variables whose corresponding data entry has been modified. In various embodiments, process 380 (e.g., a receiving process) can access the array 365 (e.g., the blocks 372-1, 372-2, . . . , 372-N) and can be used to process the identified blocks.

In various embodiments, blocks whose flag is not set (e.g., blocks that do not contain at least one state change notification) are not processed. In such embodiments, not processing unflagged blocks can conserve processor resources, which can be used to execute various other tasks and processes. In various embodiments, the flags 374-1, 374-2, . . . , 374-N are checked in a sequential order. Such checking arrangements can reduce processing time and organization of the flags, in some embodiments.

In various embodiments, processing of the blocks is performed by a background process. In such embodiments, the background process can be a timer driven process that can wake up periodically to check the flags 374-1, 374-2, . . . , 374-N of the blocks 372-1, 372-2, . . . , 372-N. That is, the process can cycle through the flags to determine which, if any, of the blocks include state change notifications. In some embodiments, the background timer process can run as a part of process 380.

In various embodiments, the timer driven process can be configured to process a predetermined number of state change notifications, which correspond to a predetermined number of variables. The predetermined number of state change notifications that can be processed can depend on factors including the time period in which the background process is run and/or the number of clock cycles used to process a notification, among other factors. Embodiments in which the background process runs periodically can reduce and/or prevent a processing resource (e.g., a processor) from becoming overloaded due to processing numerous state changes.

In various embodiments, the timing of when the background process runs, the rate at which the process checks the flags, and/or the number of block entries processed by the process can be configurable. For example, instructions can be executed to cause a background process to check flags at a rate of one flag per clock cycle, two flags per clock cycle, or one flag per 50 clock cycles, among other rates. In various embodiments, controlling the rate at which the block processing occurs can reduce and/or prevent processor resources from becoming overloaded and can conserve the processor resources which can reduce and/or prevent the other processes from being starved (e.g., from lacking adequate processor resources).

Figure 4:
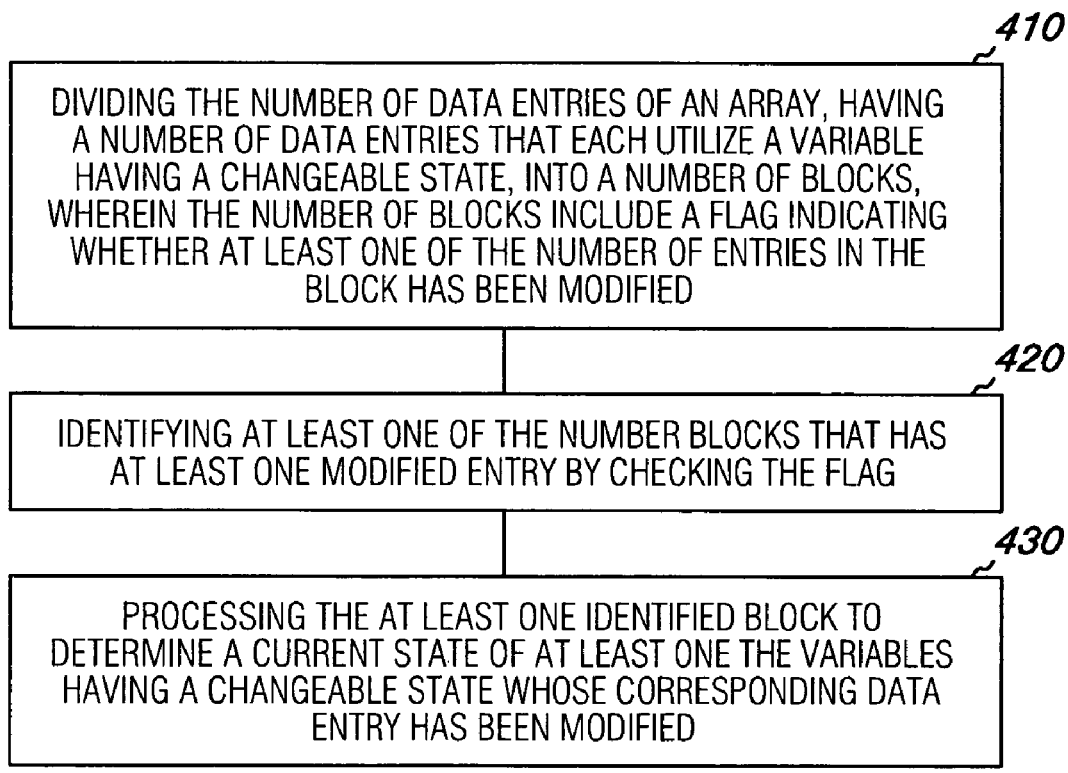
FIG. 4 is a block diagram illustrating a method for notification processing according to an embodiment of the present disclosure.

FIG. 4 is a block diagram illustrating a method for notification processing according to an embodiment of the present disclosure. As shown at block 410, the method includes dividing the number of data entries of an array, having a number of data entries that each utilize a variable having a changeable state, into a number of blocks, wherein the number of blocks include a flag indicating whether at least one of the number of entries in the block has been modified. As discussed above, the state changeable variable can be a variable shared by multiple software modules (e.g., programs and/or processes associated therewith). The flag can be a dirty bit or other suitable indicator.

At block 420, the method includes identifying at least one of the number blocks that has at least one modified entry by checking the flag. Modifying the data entries can include overwriting a prior state change notification with a current state change notification. As previously discussed herein, a background process can execute to cycle through the flags periodically in order to determine which blocks, if any, have current state change notifications to be processed.

At block 430, the method includes processing the at least one identified block to determine a current state of at least one the variables having a changeable state whose corresponding data entry has been modified. In various embodiments, blocks that do not have entries containing state change notifications are not processed. Therefore, processor resources can be conserved and used for executing various other instructions, e.g., programs.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for processing notifications, comprising:
   in an array stored in a memory device and having a number of data entries that each utilize a variable having a changeable state, dividing the number of data entries into a number of blocks, each block comprising a flag indicating whether at least one of the number of entries in the block has been modified;
   identifying at least one of the number of blocks that has at least one modified entry by checking the flag associated with the at least one of the number of blocks; and processing the at least one identified block to determine a current state of at least one of the variables having a changeable state whose corresponding data entry has been modified.

2. The method of claim 1, wherein the method includes modifying the number of data entries that each utilize a variable having a changeable state when the state of the variable changes.

3. The method of claim 2, wherein modifying the number of entries when the state of the variable changes includes overwriting the number of entries.

4. The method of claim 1, wherein processing the at least one identified block includes processing a predetermined number of entries in the block to determine the current state of a corresponding predetermined number of variables.

5. The method of claim 1, wherein the method includes checking the flags of the number of blocks in a sequential order.

6. The method of claim 2, wherein the method includes:
modifying the number of data entries utilizing said variable when the state of said variable changes by using a first process; and
processing the at least one identified block by running a second process which accesses the array.

7. The method of claim 6, wherein running the second process includes running a background process that checks the flags of the number of blocks.

8. The method of claim 6, wherein using the first process includes using a process associated with a first set of computer executable instructions and using the second process includes using a process associated with a second set of computer executable instructions.

9. The method of claim 1, wherein dividing the number of data entries of said array into said number of blocks includes dividing the number of data entries of a byte array into a number of blocks.

10. A computer readable medium including executable instructions stored thereon that can be executed by a processor of a computing device to perform a method for processing state change notifications that includes:
creating an array that includes a number of entries that correspond to information that can change state;
partitioning the number of entries of the array into a number of blocks, wherein each block in the number of blocks comprises an associated flag that indicates whether at least one of the number of entries in the block has been modified;
identifying at least one of the number of blocks that has a modified entry by checking the associated flag; and
processing at least one state change notification of the at least one identified block.

11. The medium of claim 10, wherein creating an array that includes a plurality of entries that correspond to information that can change state includes creating an array of entries that correspond to state changing variables associated with a first process.

12. The medium of claim 10, wherein the method includes using a dirty bit as the associated flag.

13. The medium of claim 10, wherein the method includes identifying the at least one of the number of blocks that has a modified entry by checking the associated flag on a periodic basis.

14. The medium of claim 13, wherein the method includes processing a predetermined number of state change notifications when the at least one of the number of blocks is identified.

15. The medium of claim 13, wherein identifying the at least one of the number of blocks that has a modified entry by checking the associated flag on a periodic basis includes using a background process.

16. The medium of claim 10, wherein the method includes modifying the number of entries that correspond to information that can change state when the state of the information changes such that the modified entries include a state change notification that indicates a current state of the information.

17. The medium of claim 16, wherein the method includes overwriting a prior state change notification with a subsequent state change notification such that the prior state change notification is removed from the modified entry.

18. A computing system, comprising:
a processor;
a memory coupled to the processor, wherein the memory includes executable instructions storable thereon that can be executed by the processor to process state change notifications by:
partitioning an array having a number of elements that correspond to a number of variables associated with a first process into a number of blocks, each block comprising a flag indicating whether at least one of the number of elements in the block includes a state change notification;
modifying the number of elements that correspond to the number of variables to include a state change notification when the first process determines a state change of the number of variables;
identifying at least one of the number of blocks that has an entry that includes a state change notification by checking the flags; and
processing at least one state change notification of the at least one identified block by using a timer process.

19. The system of claim 18, wherein the timer process is a background process.

20. The system of claim 18, wherein the background process is configured to cycle through the flags of the number of blocks periodically.

21. The system of claim 18, wherein at least one of the number of variables is associated with a port of the computing system.

22. The system of claim 18, wherein the first process is a process of a sending module.

* * * * *